March 31, 1953     A. R. NISBET, SR     2,632,923
METHOD AND APPARATUS FOR CLEANING SEED
COTTON AND OTHER FIBROUS MATERIALS
Filed Jan. 31, 1949     2 SHEETS—SHEET 1
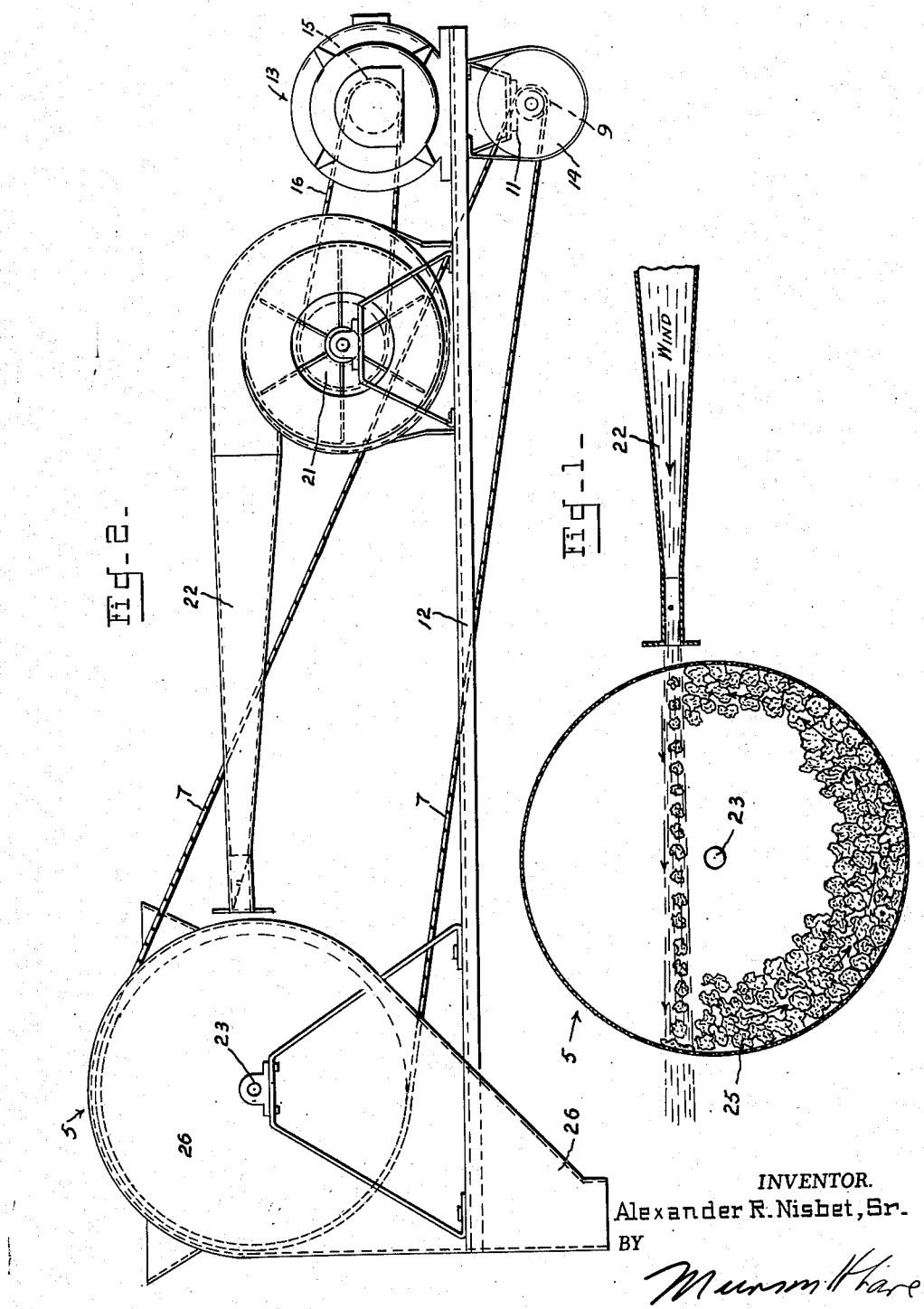
INVENTOR.
Alexander R. Nisbet, Sr.
BY

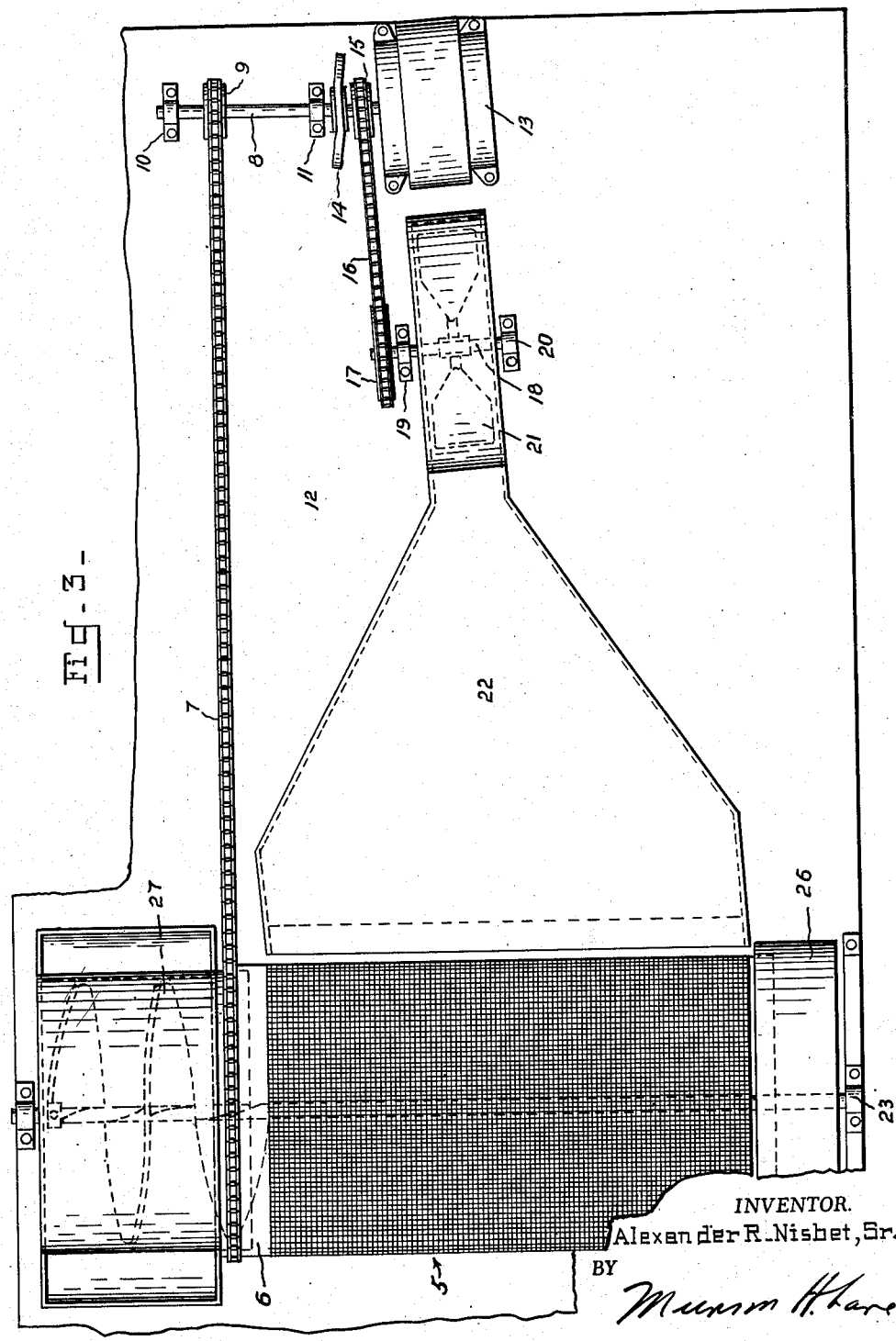

Patented Mar. 31, 1953

2,632,923

UNITED STATES PATENT OFFICE 2,632,923

METHOD AND APPARATUS FOR CLEANING SEED COTTON AND OTHER FIBROUS MATERIALS

Alexander Robinson Nisbet, Sr., San Angelo, Tex.

Application January 31, 1949, Serial No. 73,786

6 Claims. (Cl. 19—72)

This invention relates to methods and apparatus for cleaning seed cotton and other fibrous materials, such as wool, goat hair, mohair and the like, and in general aims to provide an extremely simple mechanism and method which will be effective, rapid and of large capacity or productive volume. The invention particularly seeks to provide a method and apparatus which may be used with present cotton gins or may be employed in the cotton field on cotton-harvesting machines. Other objects and advantages will be pointed out in or become apparent from the following description of apparatus for practicing the method.

In the accompanying drawings showing a preferred embodiment of the invention—

Fig. 1 is a diagrammatic view showing the rotary screen or cylinder in transverse cross section and the air blast means showing also the approximate shape of the air blast itself;

Fig. 2 is a side elevation of the machine viewed from the discharge end of the cylinder;

Fig. 3 is a top plan view of the machine, omitting the machine base or frame.

Referring particularly to the drawings, the preferred apparatus includes a rotary cylinder or screen, designated generally at 5, through which the cotton, wool or other fibrous product travels while being cleaned. Cleaning is effected partly by agitation and partly by an air blast which blows through the screen and separates the dirt, leaves, pin trash, etc. from the fibrous material, the screen catching the fibrous material and confining it until it is finally discharged almost or quite free of any adulterant, trash or dirt. For seed cotton, the screen may have three meshes to the inch; for wool or mohair, the size of the meshes will be selected to yield the best results with the particular product to be cleaned. The rotary screen is arranged so as to rotate about a substantially horizontal axis, being driven by conventional mechanism which need not be described.

Secured to one end of the screen is a collar 6 which is cylindrical and serves as a pulley, a belt 7 being passed around the collar 6 and being driven by a shaft 8 and a pulley 9. Shaft 8 rotates in bearings 10, 11 fixed to the machine base or frame 12. An electric or other motor 13 drives shaft 8 through a universal joint 14, the axis of motor 13 being skewed or at an angle to the axis of said shaft. Motor 13 is also mounted on base 12 and drives a pulley 15 which drives a belt 16 trained around a larger pulley 17 on a blower shaft 18 rotatable in bearing 19, 20 likewise fixed to the machine base. A blower 21 is driven by shaft 18 at a high speed to force a comparatively strong blast of air through a long, narrow nozzle 22 whose discharge slot is adjacent the rotary screen but slightly above the plane of the horizontal axis 23 of the screen. The nozzle 22 has a length substantially equal to the length of the foraminous or perforate portion of the screen, but its width may be as little as one inch, to provide a long, narrow zone of agitation extending transversely through the screen from one end to the other. The nozzle is also slightly turned or canted relative to the longitudinal axis 23, so that the air blast has a component parallel to said axis, the purpose being to cause the fibrous material to travel slowly through the cylindrical screen from end to end while being agitated to free it of foreign matter. The direction of rotation of the screen is such as to lift the seed cotton 25 (or other fibrous material) up into the air blast, whereupon the seed cotton will be blown transversely across the cylinder and forcibly against the inside wall thereof. Further rotation of the cylinder will carry the seed cotton down and around and up to another contact with the air blast, whereupon it is blown across the cylinder again, but strikes the cylinder at a point a little closer to the discharge end. This process continues until the seed cotton reaches a hood 26 at the discharge end and moves by gravity down the hood and out of the machine. A screw conveyor 27 or other conveyor means is employed to feed the fibrous material to the receiving or feed end of the cylinder, or if preferred feeding may be accomplished manually.

Thus it is seen that the described apparatus provides a rotating screen for confining the fibrous material while it is continually lifted up to be caught by a blast of air and thrown or slapped against the foraminous wall of the screen on the opposite side. This process, repeated over and over, causes dirt and other foreign matter to be dislodged from the cotton and blown out through the screen. The small component of force causing longitudinal travel of the fibrous material through the screen is well calculated to cause the fibrous material to be blown many times against the screen before it is discharged into the hood. Each time a cotton boll is blown it travels a few inches along the cylinder while traversing the cylinder transversely; then it passes out of the air blast and moves in an arcuate path until again engaged by the air blast.

While a cylinder is described and claimed, obviously a hollow screen having a polyhedral shape in cross section could be used, and all such shapes are intended to be covered by the term "cylinder". The screen could have round holes or perforations instead of the square meshes shown, and could be mounted so that its axis is a little inclined to the horizontal, thereby to accentuate or accelerate the travel through the cylinder. The mechanical drives for the shaft may be something other than the belt and pulley combinations shown, and numerous other changes may be made, within the scope of the appended claims.

Having described my invention, what I claim as new and desire to secure by Letters Patent is:

1. A process of cleaning fibrous material which comprises feeding the fibrous material to be cleaned into a substantially unobstructed rotating cylinder having foraminous walls, whereby said fibrous material tends to rise on one side of the cylinder and descend at the other side, blowing air across the unobstructed interior of the cylinder along the rising side of the cylinder with sufficient force to carry the fibrous material and adulterant matter at high speed across the cylinder to the opposite side thereof from the side of entry of the air blast whereby the adulterant material passes through the foraminous wall and the fibrous material is retained within the cylinder, continuing the rotation of the cylinder and the air blasting until the fibrous material is thoroughly cleaned, and removing the cleaned fibrous material from the cylinder.

2. A machine for cleaning fibrous material comprising a cylinder having perforated walls and a substantially unobstructed interior, said cylinder being rotatable about a generally horizontal axis, power means to rotate the cylinder about its axis, means for feeding the fibrous material to be cleaned into one end of the cylinder, air blast means arranged along one side only of the cylinder to direct a blast of air through the unobstructed interior of the cylinder in a direction generally at right angles to the axis of the cylinder and strong enough to convey the fibrous material and the adulterant matter to be removed therefrom to the opposite side of the cylinder, the perforations of the cylinder walls permitting the air blast and the adulterant matter to pass therethrough but holding the fibrous material within the cylinder, and means at the opposite end of the cylinder from the feed end, into which the cleaned fibrous material is discharged, the direction of rotation of the cylinder being such as to lift the fibrous material up to the air blast on the same side of the cylinder as the air blast, the air blast means being disposed at a horizontally oblique angle relative to the axis of the cylinder whereby it blows the fibrous material toward the discharge end of the cylinder as well as transversely thereof.

3. An apparatus for cleaning fibrous material comprising a drum rotatable about a horizontal axis and having a foraminous peripheral wall, and having a substantially unobstructed interior, said drum having an inlet for fibrous material to be cleaned adjacent one end thereof and a discharge outlet at the opposite end thereof, means for rotating the drum whereby the fibrous material contained therein tends to rise along one side and descend along the other, and means at one side of the drum external thereto arranged to direct an air blast at a horizontally oblique angle relative to the axis of the drum, whereby the fibrous material is directed toward the discharge end of the cylinder as well as transversely thereof for removal of dirt.

4. In apparatus for cleaning fibrous materials, a rotary cylinder having a substantially horizontal axis and having foraminous cylindrical walls and a substantially unobstructed interior, said cylinder being adapted to receive the fibrous material at one end and to discharge it at the other end, means providing a transverse blast of air inclined at a horizontally oblique angle with reference to the axis of rotation of the cylinder, and means to rotate the cylinder about that axis.

5. In apparatus for cleaning fibrous material, a rotary cylinder having a substantially horizontal axis and foraminous cylindrical walls and a substantially unobstructed interior, said cylinder being adapted to receive the fibrous material at one end and to discharge it at the other end, means providing a long, narrow blast of air moving transversely through the cylinder substantially from the receiving to the discharge end of sufficient strength to pick up the fibrous material which is uppermost in the cylinder and blow it across the cylinder to the opposite side against the cylinder wall, while removing the adulterant matter from the interior of the cylinder, the air blast being directed not only transversely of the cylinder but having a component parallel to the axis of rotation, so that the air blast moves the fibrous material in the direction of the discharge end of the cylinder.

6. In apparatus for cleaning fibrous materials such as seed cotton, a rotary cylinder having a substantially horizontal axis and foraminous cylindrical walls and a substantially unobstructed interior, said cylinder being adapted to receive the fibrous material at one end and to discharge it at the other end, means providing a long, narrow blast of air moving transversely through the cylinder substantially from the receiving to the discharge end, the air blast being of sufficient strength to pick up the fibrous material which is uppermost in the cylinder and blow it across the cylinder to the opposite side and more or less flatten it against the cylinder wall, while removing the adulterant matter from the interior of the cylinder, the air blast being confined to a zone slightly above the axis of rotation of the cylinder, and being directed not only transversely of the cylinder but having a component parallel to the axis of rotation, so that the air blast moves the fibrous material in the direction of the discharge end of the cylinder.

ALEXANDER ROBINSON NISBET, Sr.

REFERENCES CITED

The following references are of record in the file of this patent:

UNITED STATES PATENTS

| Number | Name | Date |
| --- | --- | --- |
| 700,078 | Pennypacker | May 13, 1902 |
| 1,026,432 | Dey | May 14, 1912 |
| 2,160,253 | Rylander | May 30, 1939 |
| 2,339,295 | Rust | Jan. 18, 1944 |
| 2,421,477 | Blewett | June 3, 1947 |
| 2,491,877 | Schug | Dec. 20, 1949 |